No. 801,537. PATENTED OCT. 10, 1905.
S. J. MASSIE.
SELF SETTING TRAP.
APPLICATION FILED MAY 26, 1905.
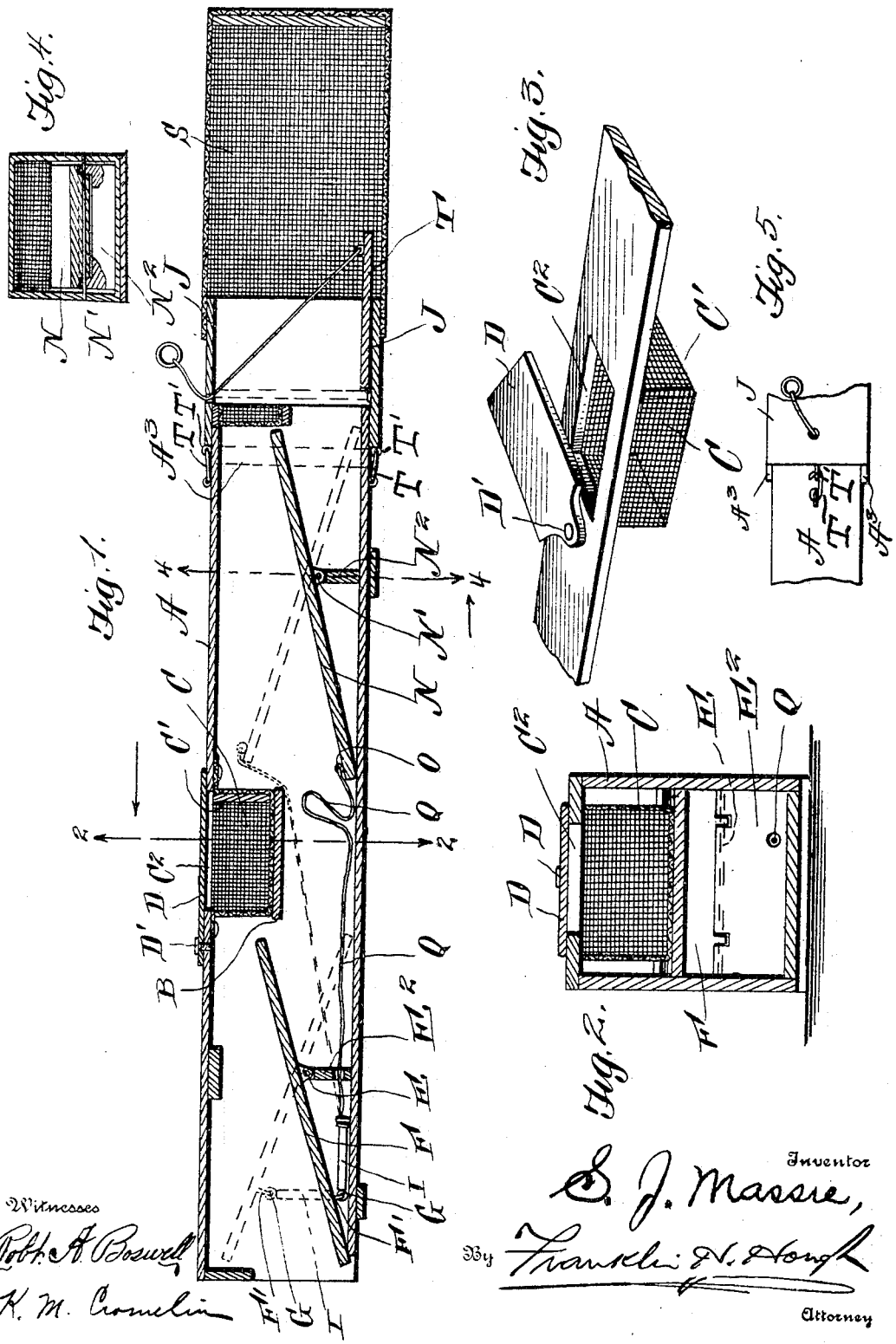

UNITED STATES PATENT OFFICE.

SAMUEL JETT MASSIE, OF LONGVIEW, TEXAS.

SELF-SETTING TRAP.

No. 801,537.                  Specification of Letters Patent.               Patented Oct. 10, 1905.

Application filed May 26, 1905. Serial No. 262,530.

*To all whom it may concern:*

Be it known that I, SAMUEL JETT MASSIE, a citizen of the United States, residing at Longview, in the county of Gregg and State of Texas, have invented certain new and useful Improvements in Self-Setting Traps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in self-setting and ever-set traps; and the object of the invention is to produce a simple and efficient trap in which as an animal enters the trap and going toward an inaccessible bait means will be actuated by the weight of the animal for imprisoning the latter, and as the animal attempts to escape by going further into the trap the weight of the animal will actuate mechanism for resetting the trap as the animal passes into a cage-compartment, leaving the trap in readiness for another animal to enter.

The invention consists, further, in various details of construction and in combinations and arrangements of parts, as will be hereinafter fully described and then specifically defined in the appended claims.

My invention is illustrated in the accompanying drawings, which, with the letters of reference marked thereon, form a part of this application, and in which drawings—

Figure 1 is a vertical longitudinal sectional view through my improved trap. Fig. 2 is a cross-sectional view on line 2 2 of Fig. 1, and Fig. 3 is a detail view showing a portion of the top of the trap. Fig. 4 is a cross-sectional view on line 4 4 of Fig. 1, and Fig. 5 is a top plan view of a part of the frame, showing the manner in which the frame of the cage is fastened to the body portion of the trap.

Reference now being had to the details of the drawings by letter, A designates a casing which may be of any suitable dimensions or shape, and B designates a sectional partition mounted midway the length of the casing and forming a platform or support upon which the bait-receptacle C rests. One end of said receptacle is closed by a solid end C' for the purpose of preventing an animal from seeing the bait after it has passed by said receptacle, while the opposite end of the bait-receptacle is of open meshwork to allow the animal to see the bait to induce it to enter the trap. The top of the casing has an opening $C^2$, through which the bait may be inserted into said receptacle, and D designates a hinged lid, one end of which is pivotally mounted at D', said lid adapted to swing laterally to allow access to be had to the receptacle or to close the same.

Pivotally mounted on the pins E in the side walls of the casing, which pins are supported upon the partition $E^2$, is a tilting platform F, and to the under side of said platform is fastened an eye F', to which a ring G is connected, which ring is carried by the swinging post I. Said post is provided to form a support to hold the outer end of said platform tilted while an animal which passes up the platform passes the central pivotal portion thereof and starts toward the inner end of the platform, causing the inner end of the platform to tilt down and the outer end to tilt upward.

N designates a second tilting platform, which is pivotally mounted upon pins N', passing through the sides of the casing and resting upon a partition $N^2$.

O designates a lug or projection upon the inner end of the platform N, and Q designates a string one end of which is fastened to the lug O and the other end, passing through an aperture in the partition $E^2$, is secured to the lower swinging end of the post I.

J designates a square-outlined frame which fits over one end of the casing A, the inner movement of said frame being limited by the cleats $A^3$, which are fastened upon the opposite sides of the casing A. Said frame is held to the casing by means of the hooks T and eyes T' shown in the drawings, and to the outer end of said frame is a cage S, into which the animals pass after leaving the second platform. A door T is pivotally mounted within said frame to allow access to the cage and at the same time to prevent an animal escaping from the cage when once past said door.

The operation of my trap is as follows: An animal passing in at one end of the casing and up the platform F, as the animal passes the central pivotal portion thereof the platform will tilt in the position shown in dotted lines, and such movement of the platform will cause the post, which reclines in a horizontal position, as the animal goes up the inclined platform at the entrance to the trap to rise to a vertical position, forming a support to hold the outer end of the platform in an elevated position, thus affording means for shutting off the escape of the animal. As the animal attempts to pass in the opposite direction and going up the inclined platform N and as it passes the pivotal point thereof the outer end of the platform N will tilt down and the string Q pulling upon the lower end of the post will cause the same to be withdrawn from the outer end of the platform F, to which it forms a support, and as the platform F is pivoted eccentrically the outer end will tilt down, and the trap will be set for the next animal to enter the same. As the animal passes up the inclined platform N and as it gets beyond the center thereof it will be allowed to pass through into the cage, and as the weight of the animal is relieved from the outer end of the platform N, which latter is also eccentrically pivoted, said platform N will tilt to its normal position in readiness to be actuated by the following animal.

From the foregoing it will be observed that by the provision of a trap embodying the features of my invention means is provided for a self-setting and ever-set trap which will not be affected by the changes of atmosphere, as freezing, &c., and one in which a live bait may be employed, if desired, without allowing the animal to have access to the same.

While I have shown a particular form of apparatus illustrating the features of my invention, it will be understood that I may vary the construction of the same as to details without in any way departing from the spirit of the invention.

Having thus fully described my invention, what I claim as new, and desire to secure by Letters Patent, is—

1. A self-setting trap comprising a casing, two eccentrically-pivoted tilting platforms mounted within the casing, a swinging post fastened to one platform, a rope anchored to the other platform and fastened to said post and so arranged that the weight of an animal causing the first platform to tilt, will raise said post while the weight of the animal which causes the second platform to tilt, will cause the post to be withdrawn as a support from the first platform, allowing the same to assume its normal position, as set forth.

2. A self-setting trap comprising a casing, two eccentrically-pivoted tilting platforms mounted within the casing, a swinging post fastened to one platform, a rope anchored to the other platform and fastened to said post and so arranged that the weight of an animal causing the first platform to tilt, will raise said post, while the weight of the animal which causes the second platform to tilt, will cause the post to be withdrawn as a support from the first platform, allowing the same to assume its normal position, and a bait-receptacle interposed intermediate the inner ends of the tilting platforms, as set forth.

3. A self-setting trap comprising a casing, two eccentrically-pivoted tilting platforms mounted within the casing, a swinging post fastened to one platform, a rope anchored to the other platform and fastened to said post and so arranged that the weight of an animal causing the first platform to tilt, will raise said post, while the weight of the animal which causes the second platform to tilt, will cause the post to be withdrawn as a support from the first platform, allowing the same to assume its normal position, a horizontally-disposed partition intermediate the inner ends of the platforms, a bait-receptacle positioned upon said partition, a cage at one end of the trap, and a door leading from the trap to said cage, as set forth.

4. A self-setting trap comprising a casing, two eccentrically-pivoted tilting platforms mounted within the casing, a swinging post fastened to one platform, a rope anchored to the other platform and fastened to said post and so arranged that the weight of an animal causing the first platform to tilt, will raise said post, while the weight of the animal which causes the second platform to tilt, will cause the post to be withdrawn as a support from the first platform, allowing the same to assume its normal position, a horizontally-disposed partition intermediate the inner ends of the platforms, a bait-receptacle positioned upon said partition, a cage having a frame at one end adapted to telescope over the end of the trap, and means for holding the cage to the latter, as set forth.

5. A self-setting trap comprising a casing, vertical partitions extending partially across the casing, pivotal pins resting upon said partitions, tilting platforms mounted eccentrically upon said pins, a swinging post connected to one of said platforms, a rope secured to the swinging end of said post and fastened to the other platform, a removable top to the casing, a bait-receptacle secured to said top, a horizontally-disposed partition upon which said receptacle is adapted to rest, and a cage secured to the end of the trap, as set forth.

In testimony whereof I hereunto affix my signature in the presence of two witnesses.

SAM JETT MASSIE.

Witnesses:
L. WOOLLEY,
A. J. MUNDER.